Figure 5:
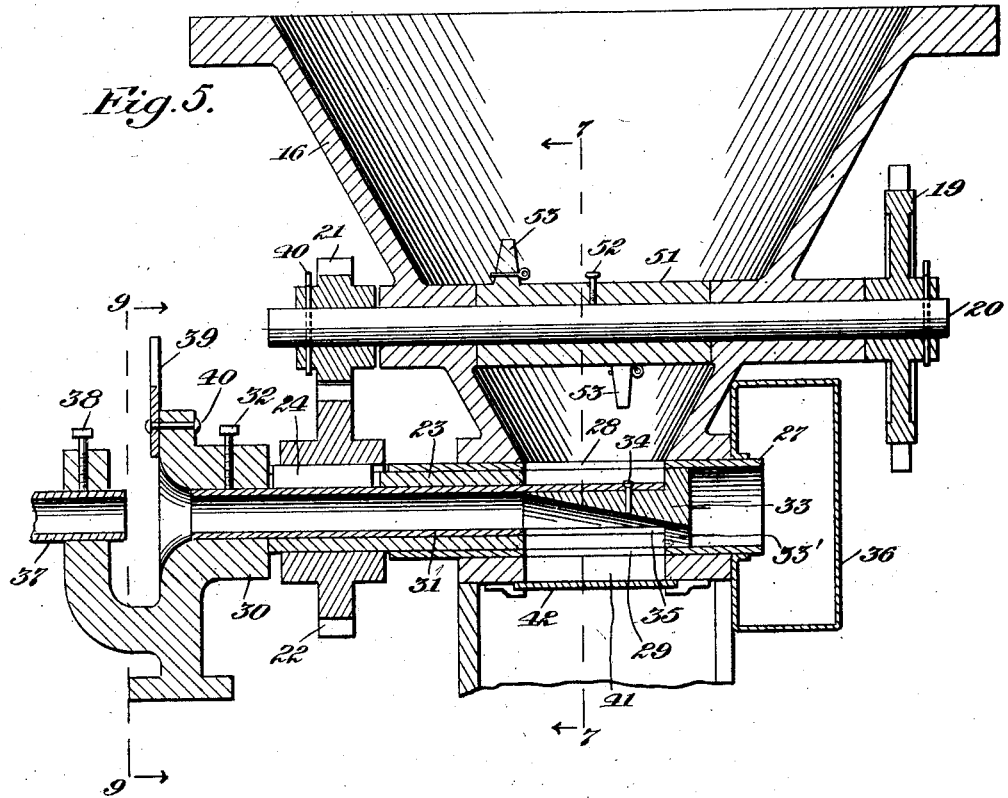

April 23, 1929.  P. H. WHITE  1,710,560
POWDER DISTRIBUTOR
Filed June 22, 1925  3 Sheets-Sheet 1
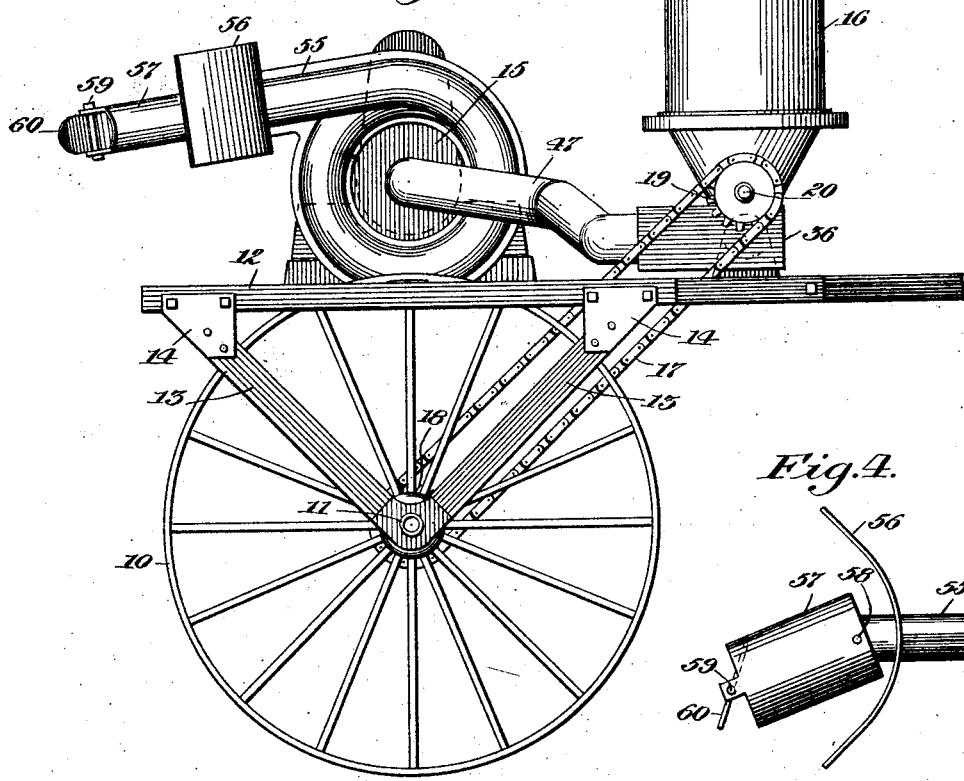
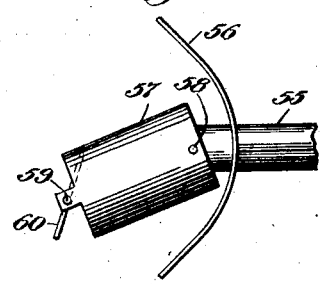
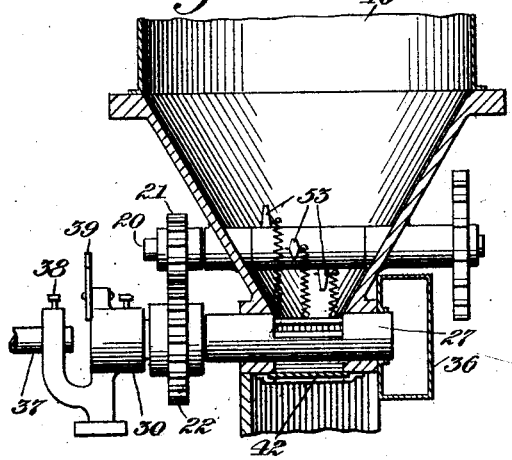
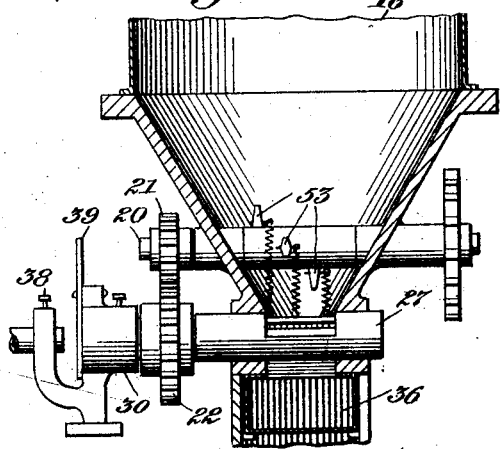
Inventor:
Paul H. White, April 23, 1929. P. H. WHITE 1,710,560
POWDER DISTRIBUTOR
Filed June 22, 1925 3 Sheets-Sheet 2

Inventor:
Paul H. White,

April 23, 1929. P. H. WHITE 1,710,560
POWDER DISTRIBUTOR
Filed June 22, 1925 3 Sheets-Sheet 3
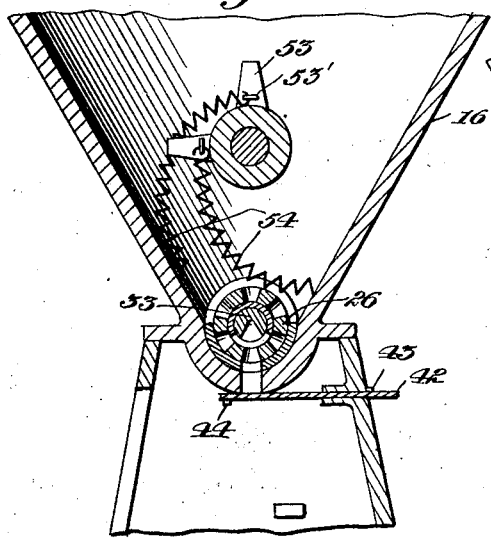
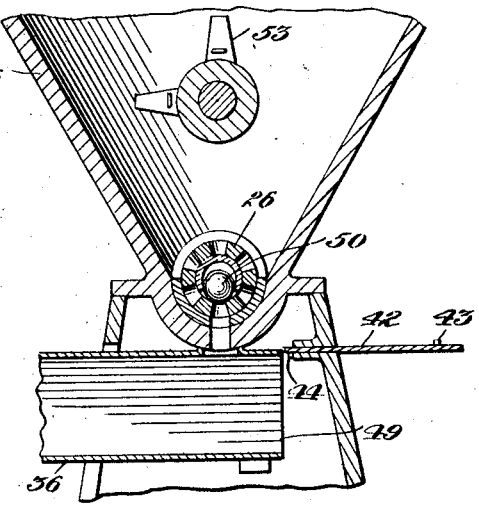
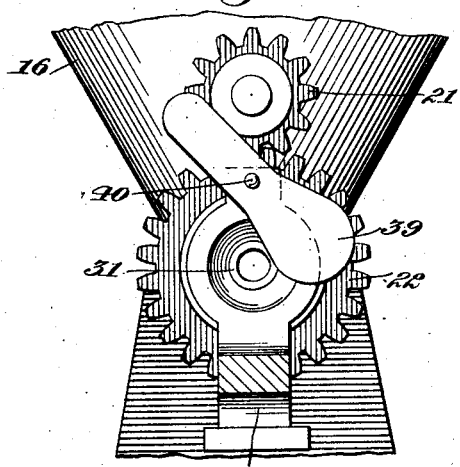
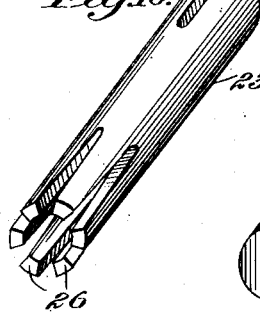
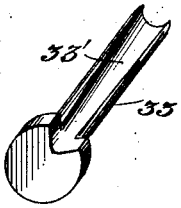
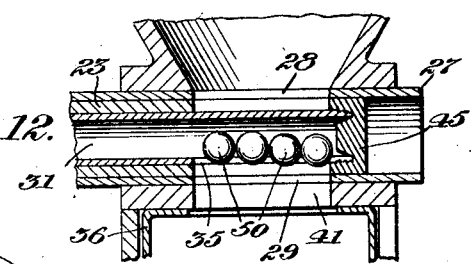
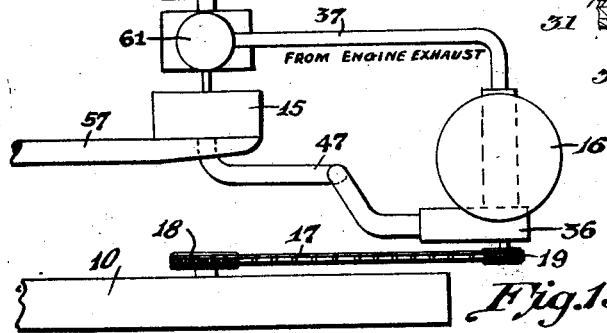
Inventor:
Paul H. White, Patented Apr. 23, 1929.

1,710,560

UNITED STATES PATENT OFFICE.

PAUL H. WHITE, OF INDIANAPOLIS, INDIANA.

POWDER DISTRIBUTOR.

Application filed June 22, 1925. Serial No. 38,821.

My said invention relates to a powder distributor and it is an object thereof to provide an improved structure for causing a dust cloud or "fog" to be formed about and among growing plants, trees or shrubbery by what may be described as the atomization of a fine powder, this powder being usually a fungicide or an insecticide, though powder useful for other purposes such as fertilizers, lime, etc., may be distributed by the device in an equally efficient manner.

Another primary object of my invention is to provide a mechanical powder distributor embodying a means for atomizing powder and "shooting" the resultant dust out into the atmosphere under high and uniform pressure independent of the means employed for measuring and feeding the powder, thereby gaining the same degree of atomization and the same spread of distribution regardless of the rate of movement of the feeding device. This is an especially valuable feature, one instance being where a team of horses or mules is used to propel the device contemplated through a field in which case the team is apt to move much slower in the afternoon on a warm day than it did in the morning when it started to work. This brings about uniform distribution in the application of expensive fungicides and insecticides as against wasting these powders earlier in the day to insure uniform application later in the day, and vice versa, and it insures the constant application of the amount of powder required to perform properly the function of control or extermination for which it was intended, which would not be the case where a machine distributes only the exact amount required earlier in the day and then the amount gradually becomes reduced until the quantity distributed is ineffective.

Another object of the invention is to provide improved means whereby the same machine or device may be used to distribute in regular and measured quantity various kinds of powder, each having its own peculiar properties of cohesion, corrosiveness and explosiveness due to fineness or nature, and each varying in fineness or coarseness of texture.

Another object of the invention is to provide improved means for controlling the feeding movement of the powder by the actual ground surface passed over, so that the same quantity of powder will be distributed regardless of the speed with which said ground surface is passed over.

Another object of the invention is to provide improved means for varying the quantity of powder to be distributed over a given ground surface to be passed over, thereby enabling the even distribution of any desired quantity of powder per acre or area, as, for example, two pounds per acre, four pounds per acre, or any larger quantity per acre.

With these and incidental objects in view, the invention consists in certain novel features of construction and combinations of parts, the essential elements of which are set forth in the appended claims, and a preferred form of one embodiment of which is hereinafter described with reference to the drawings which accompany and form part of these specifications.

Figure 6:
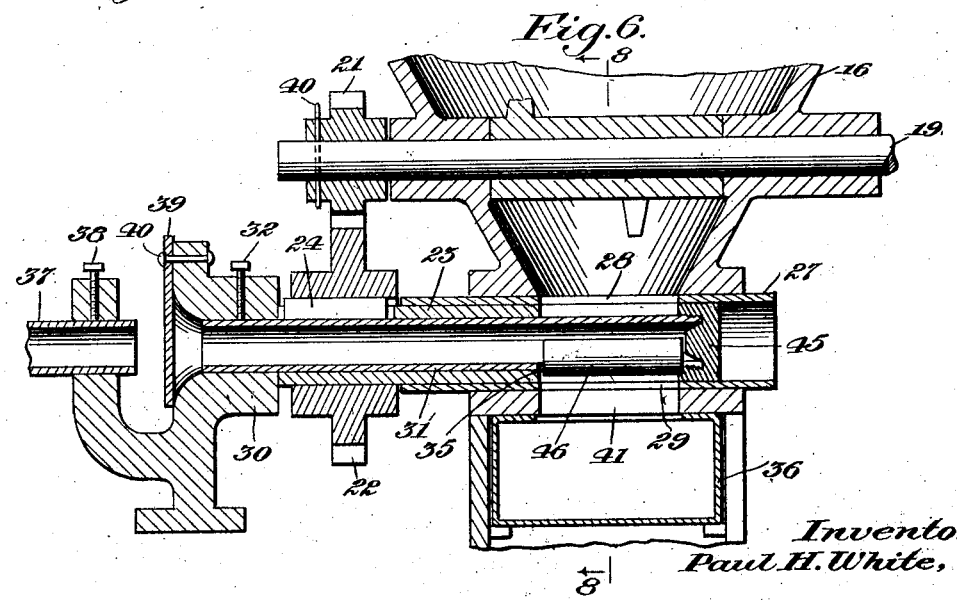

Referring to the accompanying drawings which are made a part hereof and on which similar reference characters indicate similar parts, Figure 1 is a side elevation of my improved device, Figure 2, a section at right angles to the plane of Fig. 1, Figure 3, a similar section showing a different arrangement of parts, Figure 4, a detail of a device shown in Fig. 1, Figure 5, a section similar to Fig. 2, but on a different plane, Figure 6, a section similar to Fig. 3, but on a different plane, Figure 7, a section on line 7—7 of Fig. 5 looking in the direction of the arrows, Figure 8, a section on line 8—8 of Fig. 6, Figure 9, a section on line 9—9 of Fig. 5, Figure 10, a detail of a part shown in section in Fig. 7, Figure 11, a detail of another part shown in section in Fig. 7, and Figure 12 is a sectional view of a detail showing a modified form of check valve, and Figure 13 is a plan view of the device.

In the drawings reference character 10 indicates a ground wheel supporting an axle 11 on which the frame of the machine is pivotally supported. This frame as here shown comprises a triangular structure having a horizontal member 12 and a member 13 having two branches extending diagonally from the axle to the member 12 approximately at right angles to one another said parts being secured to the member 12 by plates 14 or in any other suitable manner. A fan 15 and a hopper 16 are mounted on the horizontal part 12 of the frame and secured in place in any desirable or conventional manner.

A sprocket chain 17 connects a sprocket 18 fixed to the wheel 10 to a sprocket 19 on a shaft 20 near the bottom of the hopper. The shaft 20 has secured thereto at the opposite end from the sprocket a gear 21 meshing with a gear 22 secured to a sleeve 23 by a spline 24. The sleeve 23 (Figs. 5 and 6) has a slot at 25 to receive the spline 24 and is provided at the opposite end with tapered slots providing a series of tapered extensions 26 which in conjunction with a hollow shaft 31, hereinafter described, and a concentric tube 27 form pockets between them, which pockets are open at one end. The pockets between said tapered extensions communicate with the interior of the hopper through a slot 28 in the tube 27 which is closed at one end by a tube leading to the fan casing 15.

The tube 27 has a slot 29 at the underside providing an outlet for the powder in the hopper. A fixed bracket 30 at the left-hand side of the hopper has a bore to receive one end of a hollow shaft 31 located concentrically with the tube 27 and the sleeve 23. The hollow shaft 31 is held in place in the bracket by a set screw 32. The sleeve 23 extends nearly to the right-hand end of the tube 27 and in one form of the invention is provided with a plug 33 for closing the last named end, this plug being inserted through the open end of the pipe and being held in place by a pin 34 passing through a hole in the hollow shaft 31 into a hole in the plug. The plug 33 has an enlarged head fitting closely in the tube 27 to support the hollow shaft 31 and is hollowed out at its underside to provide a passage 33′ arcuate in cross-section which tapers from left to right as clearly shown in Fig. 11 to provide an easy outlet for air or gases. This passage coacts with a slot at 35 in the hollow shaft 31 and with the space between a pair of extensions 26 to provide a clear passage from the hollow shaft 31 to a casing 36 supported on the free end of the tube 27.

A pipe 37 is mounted in a bore in the bracket 30 or in any other suitable manner, said pipe being held in place by a set screw 38. The pipe 37 is connected to the exhaust of the internal combustion engine 61 which drives the fan or to any other suitable source of gas under pressure and in cases where the device is being utilized for the distribution of materials which do not have an explosive tendency or which are not inflammable the powerful intermittent pressure of the engine exhaust will be utilized to force the powder out through the passage above mentioned into the casing 36 as fast as the pockets between extensions 26 bring it into position at the inner side of the hollow shaft 31, it being understood that these pockets are closed at the outer side throughout their movement except as illustrated in Figures 5 and 6.

A gate 39 is pivoted at 40 and this gate is movable into the position shown in Fig. 6 to close the bore in the right-hand arm of the bracket 30 and prevent ingress of the pneumatic pressure from the engine or other source. When the device is being used in the arrangement of Fig. 5 a downward passage through slots 35, 29 and a slot at 41 in the frame of the machine is closed by means of a gate 42 (Fig. 7) the inward movement of the gate being limited by a stop 43.

When the device is to be utilized for distributing powder which is inflammable or explosive or for any other reason it is undesirable to use pneumatic pressure the gate 42 is drawn back to the position shown in Fig. 8, its outward movement being limited by a stop 44. The set screw 32 is backed off sufficiently to release the hollow shaft 31 which is now withdrawn endwise from the machine, the casing 36 being moved out of the way, and a hollow shaft 31 such as shown in Fig. 6 is substituted therefor, this sleeve having a cap 45 fitting over the end thereof and held in place by screw threads. The gate 39 is now closed to shut out the exhaust gases from the engine. The cap is here shown as having an inner boss, the extreme inner face of which is approximately flush with the end of the slot 29 as is also the inner extremity of the outer flange of the cap. A roller 46 is placed in the hollow shaft 31. In some cases, especially where the powder is very fine, it will have a tendency to "bridge" the slots between extensions 26 and so stop the flow of powder. The roller is of such dimensions that it will enter between the extensions by reason of its smaller diameter and consequent sharper curvature of surface and so will bear upon and break down such bridges to prevent clogging of the flow. The length of the roller is such, as will be seen from consideration of Fig. 6, that its endwise movement is limited at one end by coincident edges of the inner and outer parts of the cap and the slot 29 and at the other end by the left-hand end of the slot 35.

The casing 36 is connected to the fan 15 by a pipe 47 having an angular joint such as that in the position of Figs. 5 and 1. An opening in the casing fits over the end of tube 27. When the casing is swung through an arc of 90° it will pass underneath the frame 12 into the position shown in Fig. 6 where the opening in the casing will register with the slot 41 to receive the powder emerging from the feeding apparatus.

The casing 36 is open at its forward end as indicated at 49 in Fig. 8. The suction of the fan is such as to draw in air with sufficient velocity to draw the powder through the casing and into the fan regardless of whether it is supplied by a mechanical feeding device as in Fig. 6 or by pneumatic pressure as in Fig. 5.

It will be obvious that balls can be utilized instead of cylindrical rolls, the use of balls being illustrated in Figs. 8 and 12 at 50. The operation is substantially similar in either case.

A sleeve 51 is secured to the shaft 20 by means of a set-screw 52 and this sleeve is provided with a plurality of lugs 53 for stirring up the powder in the hopper. These lugs are shown as four in number and each one carries a screw 53' (Fig. 7) providing a pivotal support for a spring 54, these springs being free at one end whereby they can wind about the shaft collecting tension in the turns as they will gyrate about their pivots or screws 53' as the sleeve rotates and thus aid in stirring up the powder in the hopper and forcing it to the opening of the hopper so that it will feed freely and regularly out through the passages in the rotary sleeve 23 and either out through 29 or 33', whichever is being used at the time.

An outlet pipe 55 leads from the fan to the rear of the machine and this pipe has a shield 56 mounted thereon. At the rear side of the shield a swinging hood 57 is pivotally mounted on the pipe at 58 to move freely on the stationary pipe 55, the swinging movement being limited by engagement of the rear rim of the hood with said pipe. The hood is provided at its forward end with extensions carrying pivots 59 on which a vane 60 is mounted for oscillatory movement.

In the operation of my device the hopper is filled to a greater or less extent with pulverulent material, the engine is started, and the machine is moved across a field by any desirable means. Thereupon the shaft 20 is driven from the sprocket gear fixed to the wheel 10 thus agitating the material in the hopper by means of lugs 53 and the springs 54. Should the material cavitate so as to be out of reach of the lugs 53 the springs can fly out and break down the material at some distance from the lugs so as to cause the flow to be maintained.

As the material is thus fed down to the bottom of the hopper it will be taken up incrementally by the pockets between the extensions or teeth 26 and these pockets will be brought successively underneath the hollow shaft 31 in line with the passage through the same whereupon the gas under velocity pressure from the engine or other source of power seeking exit through the passage in the hollow shaft will suddenly force the powder in the alined slots out through the arcuate opening in the end of the sleeve (or through slot opening 41 which ever exit at the time is open, according to the kind of powder being used) and into the casing 36. It will be understood, as previously explained, that the casing 36 may be placed in either one of two positions; one in which the powder is received from the end of the sleeve 31' through opening 33', and the other in which the powder is received from opening 41. The suction produced by the fan in the casing 15 will carry the powder along the pipe 47 out through the pipe 55. The current striking the hood 57 will cause it to swing from side to side in the manner described in my Patent No. 1,607,656, and the vane 60 will cooperate with the hood to cause it to swing from side to side.

It will be understood that there are two limiting angular positions which the vane or rudder can occupy. When said vane is in either of these positions, it acts as a rudder in the air current and guides the movable part to which it is attached (i. e. the hood 57) in a manner similar to that when a boat is maneuvered, with its nose against the wharf and its rudder "hard over". When the hood reaches its extreme position to one side the impact or inertia reverses the position of the vane, which preferably, but not necessarily has an outer part longer or heavier than the inner part to facilitate this action. Thereupon the rudder is thrown to the opposite position and under the action of the air stream forces the hood toward the opposite position. This process will be repeated indefinitely thereby scattering the atomized powder by a sort of violent shaking action to the rear and to the sides so as to form a sort of haze or "fog" over and about the growing plants or other material to be treated with powder in an atomized condition, thus serving very effectively to distribute the powder uniformly over the material or objects being treated.

The purpose of the shield 56 is to prevent the powder from being blown forward to any great extent so as to interfere with the operator and also to prevent its being distributed too largely over the space directly underneath the machine. The forward end of the hood being open at the sides between the hood and the pipe 55, air may of course pass out and carry with it the powder in suspension. This air strikes the shield 56 and is deflected to a large extent laterally so as to throw the powder outward away from the machine.

While the form of mechanism herein shown and described is admirably adapted to fulfill the objects primarily stated, it is to be understood that it is not intended to confine the invention to the one form of embodiment shown, as it is capable of embodiment in various forms all coming within the scope of the appended claims.

As described, the feed of the machine is operated by power derived from its movement. When used for dusting trees or for such like purposes, the machine would, of course, remain stationary and the feed mechanism can be operated by connection with the engine or by a hand-crank or in any other appropriate manner, as will be readily understood.

Having thus fully described my said invention, what I claim as new and desire to secure by Letters Patent, is:

1. A powder distributor comprising a frame, wheels supporting said frame, a hopper, means driven by said wheels for agitating material in the hopper, a fan casing on the frame, the intake of the fan casing being connected to the said hopper, an internal combustion engine for driving said fan, the exhaust conduit of said motor being connected to the said hopper for forcing the material from the hopper into the intake of the fan, substantially as set forth.

2. A powder distributor comprising a hopper having an outlet at the lower end, a rotary sleeve having longitudinal extensions forming slots positioned for registration with the opening in the hopper, a hollow shaft in the sleeve having a passage positioned to register with a slot in said sleeve out of register with the outlet of the hopper, and means for displacing the powder in said slot when the passage registers therewith, substantially as set forth.

3. A powder distributor as in claim 2, said means comprising means for connecting the said slot with a source of pressure fluid, substantially as set forth.

4. A powder distributor comprising a hopper having an outlet at the lower end, a rotary sleeve having longitudinal extensions forming slots positioned for registration with the opening in the hopper, a hollow shaft in the sleeve having a passage positioned to register with a slot in said sleeve out of register with the outlet of the hopper, and means for forcing air under pressure through the hollow shaft as such time, substantially as set forth.

5. In a powder distributor, a hopper having an outlet at its lower end, a rotary sleeve, a stationary shaft concentric with said sleeve said shaft having a passage at the lower side communicating with the hollow interior thereof and opening out of the end of the shaft, and radial pockets extending through the hollow sleeve said pockets being open at the end next to said passage, substantially as set forth.

6. A convertible powder distributor having a hopper, stirring means in the hopper, metering means below the hopper, a pipe having therein mechanical means to force the powder out of the metering means, the said pipe being adapted to be connected to a source of pressure fluid, and distributing means receiving the powder from said metering means, substantially as set forth.

7. A convertible powder distributor having a hopper, stirring means in the hopper, metering means below the hopper, a pipe having therein mechanical means to force the powder out of the metering means, said pipe being adapted to be connected to a source of pressure fluid, and independent pneumatic broadcasting means receiving the powder from the metering means, substantially as set forth.

In witness whereof, I have hereunto set my hand at Indianapolis, Indiana, this 18th day of June, A. D. nineteen hundred and twenty-five.

PAUL H. WHITE.